(12) United States Patent
Kikukawa et al.

(10) Patent No.: US 7,796,483 B2
(45) Date of Patent: Sep. 14, 2010

(54) METHOD FOR EVALUATING READ STABILITY OF OPTICAL DISC AND INFORMATION REPRODUCTION APPARATUS

(75) Inventors: Takashi Kikukawa, Tokyo (JP); Narutoshi Fukuzawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 745 days.

(21) Appl. No.: 11/785,879

(22) Filed: Apr. 20, 2007

(65) Prior Publication Data

US 2007/0247988 A1 Oct. 25, 2007

(30) Foreign Application Priority Data

Apr. 24, 2006 (JP) .............................. 2006-119102

(51) Int. Cl.
| | |
|---|---|
| G11B 5/00 | (2006.01) |
| G11B 7/12 | (2006.01) |
| G11B 15/52 | (2006.01) |
| G11B 5/52 | (2006.01) |

(52) U.S. Cl. .................................. 369/47.5; 369/53.31
(58) Field of Classification Search ................ 369/47.5, 369/53.31

See application file for complete search history.

(56) References Cited

FOREIGN PATENT DOCUMENTS

| | | |
|---|---|---|
| JP | A-62-15444 | 1/1987 |
| JP | U-63-87640 | 6/1988 |
| JP | 2003006941 A * | 1/2003 |
| JP | A 2003-6941 | 1/2003 |
| JP | A-2004-319033 | 11/2004 |

OTHER PUBLICATIONS

English translation for Japanese Patent Pub. JP,2003-006941,A.*

* cited by examiner

*Primary Examiner*—Daniell L Negrón
*Assistant Examiner*—Nicholas Lee
(74) *Attorney, Agent, or Firm*—Oliff & Berridge, PLC

(57) ABSTRACT

A method and apparatus for measuring the read stability of an optical disc are provided. Specifically, readout of the optical disc is repeated at each of at least two read laser beams powers being different from each other. A graph is drawn in which the inverses of the read powers are plotted on a horizontal axis and in which on a vertical axis is plotted the logarithm of a repeated readout number for each of the read powers. Here, the repeated readout number is the number of repetitions of the readout when a characteristic value for the number of repetitions of the readout varies and reaches a predetermined value. The read stability of the optical disc is evaluated by using the gradient of the graph.

4 Claims, 6 Drawing Sheets

METHOD FOR EVALUATING READ STABILITY OF OPTICAL DISC AND INFORMATION REPRODUCTION APPARATUS

BACKGROUND OF THE INVENTION

1. Field of the Invention

The present invention relates to a method for evaluating stability for repeated readout of an optical disc and to an information reproduction apparatus.

2. Description of the Related Art

At present, optical discs such as CDs (Compact Discs), DVDs (Digital Versatile Discs), BDs (Blu-ray Discs; trademark) are used to record or reproduce various types of content. When compared to other media, optical discs are more suitable for archival applications such as long-term storage of content and repeated readout. Therefore, in optical discs, read stability is very important, including the ability to maintain a certain level of signal quality even after readout is repeated any number of times, and also including the ability to prevent recorded content from being lost. Generally, optical discs are required to maintain stability even after readout is repeated about one million times.

However, when readout is actually repeated about one million times in order to evaluate stability for the repeated readout of an optical disc, a laser beam must be projected onto the disc continuously for at least several hours. This is inefficient and is likely to deteriorate the laser.

In view of the above, Japanese Patent Laid-Open Publication No. 2003-6941 discloses a method for evaluating the read stability of an optical recording medium. Specifically, in this method, a linear approximate expression for the relationship between the common logarithm of the number of readout times and a read power is determined based on measurement values obtained by repeating the readout at a plurality of read laser beam powers. The read stability when the readout is repeated at any read laser beam power is evaluated by means of the approximate expression.

SUMMARY OF THE INVENTION

In view of the foregoing problems, various exemplary embodiments of this invention provide a method and apparatus for evaluating the read stability of an optical disc more easily and more reliably than in the conventional technology.

Among reactions promoted by heat, a process represented by the following equation is referred to as a thermally activated process.

$$v = A\exp(-\Delta E/kB/T) \quad (1)$$

This equation is called the Arrhenius equation. In this instance, $v$ is the reaction rate, $\Delta E$ is the activation energy of the reaction, $kB$ is the Boltzmann constant, $T$ is temperature, and $A$ and $B$ are constants. $\Delta E$ is a value inherent to a process which determines the rate of the total reaction. The present inventors have made various investigations and consequently found that, when an optical disc deteriorates during readout, the above Arrhenius equation can be transformed into the following equations by using evaluation parameters of the optical disc.

$$N = A'\exp(\Delta E'/kB/Pr) + B' \quad (2)$$

$$\rightarrow \mathrm{Ln}(N) = \Delta E'/kB \times 1/Pr + C \quad (3)$$

In this instance, N is the number of readout times when a measure representing the signal quality of an optical disc indicates a predetermined degree of deterioration. A CNR (Carrier to Noise Ratio), a jitter, an error rate, or the like may be employed as the measure representing the signal quality. The value corresponding to the predetermined degree of deterioration may be any value. For example, a change in CNR of −3 dB (being the difference from an initial value) may be employed, or a change in a jitter of +1% (being the difference from an initial value) may be employed. Furthermore, the maximum permissible error rate of a system may be employed as the error rate. The number of readout times when the above value is detected is employed as N. $\Delta E'$ is the pseudo activation energy of the reaction, and Pr is a read power. C is a constant. Since $\Delta E$ is a value inherent to a process which determines the rate of the total reaction, the pseudo activation energy $\Delta E'$ takes a value inherent to a readout deterioration mechanism. Thus, when Pr falls within a certain range, the pseudo activation energy $\Delta E'$ is determined depending on the structure and material of the medium being measured.

The reason why equation (1) can be transformed into equation (2) is described as follows. $v$ is the rate of reaction, and N is the number of readout times undertaken when the reaction proceeds to a predetermined extent. Thus, since N can be replaced with time, $v$ is considered to be proportional to $1/N$. Therefore, the minus sign (−) in the exponential in equation (1) is replaced with a positive sign (+) in the exponential in equation (2). Furthermore, since the read power of a laser beam serving as a heat source determines the temperature of an optical disc during readout, T is approximately proportional to Pr. Therefore, by appropriately changing the constants in equations (1) and (2) (B→B'), T can be replaced with Pr.

In the present invention, read stability is evaluated by use of $\Delta E'$. Specifically, at least two read laser beam powers $Pr_2$ and $Pr_3$, being higher than a read power $Pr_1$ actually employed in a drive, are used to measure $N_2$ and $N_3$, respectively, and $\Delta E'$ is computed from equation (3). The read stability number $N_1$ at the read power $Pr_1$ actually employed in the drive is computed from the results obtained above. As is clear from equation (3), as the read power increases, the number of readout times (read period of time) until the signal quality deteriorates to a predetermined degree decreases exponentially to the inverse of Pr. Therefore, the evaluation can be performed much more easily and rapidly than an evaluation undertaken through direct measurement at the low read laser power actually employed in the drive.

The activation energy $\Delta E$ in equation (1), or $\Delta E'$ in equations (2) and (3), is a value inherent to a process which determines the rate of the reaction. Therefore, any of a CNR, a jitter, an error rate, or the like may be employed as the measure indicating the level of deterioration, if deterioration is caused by that same mechanism. In the present method, the slope $\Delta E'$ in equation (3) is employed, and thus the deterioration amount for determining the number N used for computing the gradient can be any value. For example, if deterioration is caused by the same mechanism, the deterioration amount of, for example, CNR may be any value such as −1 dB, −3 dB, or −5 db. Whether deterioration is caused by the same mechanism can be determined based on whether equations (2) and (3) hold.

On the basis of the above, the present inventors have made intensive studies. Consequently, the inventors have found that the read stability of an optical disc can be evaluated more easily and reliably than in the conventional technology by reproducing data using at least two read laser beam powers and by converting the deterioration at the powers into numerical values.

In addition to this, as is clear from the above discussion, read stability can be evaluated for read-only memory optical discs and recordable optical disc by means of the present method.

In summary, the above-described objectives are achieved by the following embodiments of the present invention.

(1) A method for evaluating read stability of an optical disc, the method comprising: repeating readout of the optical disc using a laser beam at each of at least two read powers, the powers being different from each other; drawing a graph in which inverses of the read powers are plotted on a horizontal axis and in which on a vertical axis the logarithm of a repeated readout number for each of the read powers is plotted, the repeated readout number being the number of repetitions of the readout when a characteristic value for the number of repetitions of the readout varies and reaches a predetermined value; and evaluating read stability by using a gradient of the graph.

(2) The method for evaluating read stability of an optical disc according to (1), wherein the read powers include two powers different from each other.

(3) An information reproduction apparatus for evaluating read stability of an optical disc, the apparatus comprising: a head for projecting a laser beam onto the optical disc; a laser driving circuit which supplies to the head a laser driving signal for controlling the laser beam; a laser controlling circuit which generates the laser driving signal; and a read stability evaluation circuit comprising: a characteristic value measurement unit which is capable of, when readout is repeated at each of at least two read laser beam powers being different from each other, measuring a change in a characteristic value for the number of readout times; a readout number recording unit which, when the characteristic value reaches a predetermined value, records the number of readout times at this point; and a read stability determination unit which computes the number of readout times at a normal read laser beam power on the optical disc based on data recorded by the readout number recording unit and a predetermined equation for computation.

(4) The information reproduction apparatus for evaluating read stability of an optical disc according to (3), wherein the read powers include two powers different from each other.

In the present invention, the read stability of an optical disc can be evaluated accurately in a short time.

DETAILED DESCRIPTION OF THE PREFERRED EMBODIMENTS

In the best mode, a method for evaluating read stability of an optical disc comprises: repeating the readout of the optical disc at each of at least two read powers, the powers being different from each other; drawing a graph in which the inverses of the read powers are plotted on a horizontal axis and in which on a vertical axis the logarithm of a repeated readout number for each of the read powers is plotted, the repeated readout number being the number of repetitions of the readout when a characteristic value for the number of repetitions of the readout varies and reaches a predetermined value; and estimating read stability by using a slope of the graph. Using this method, the read stability can be evaluated accurately in a short period of time. Furthermore, the evaluation can be made irrespective of the types of optical disc being used.

EMBODIMENT

Hereinafter, an exemplary embodiment of the present invention is described in detail with reference to FIGS. 1 to 3.

Figure 1:
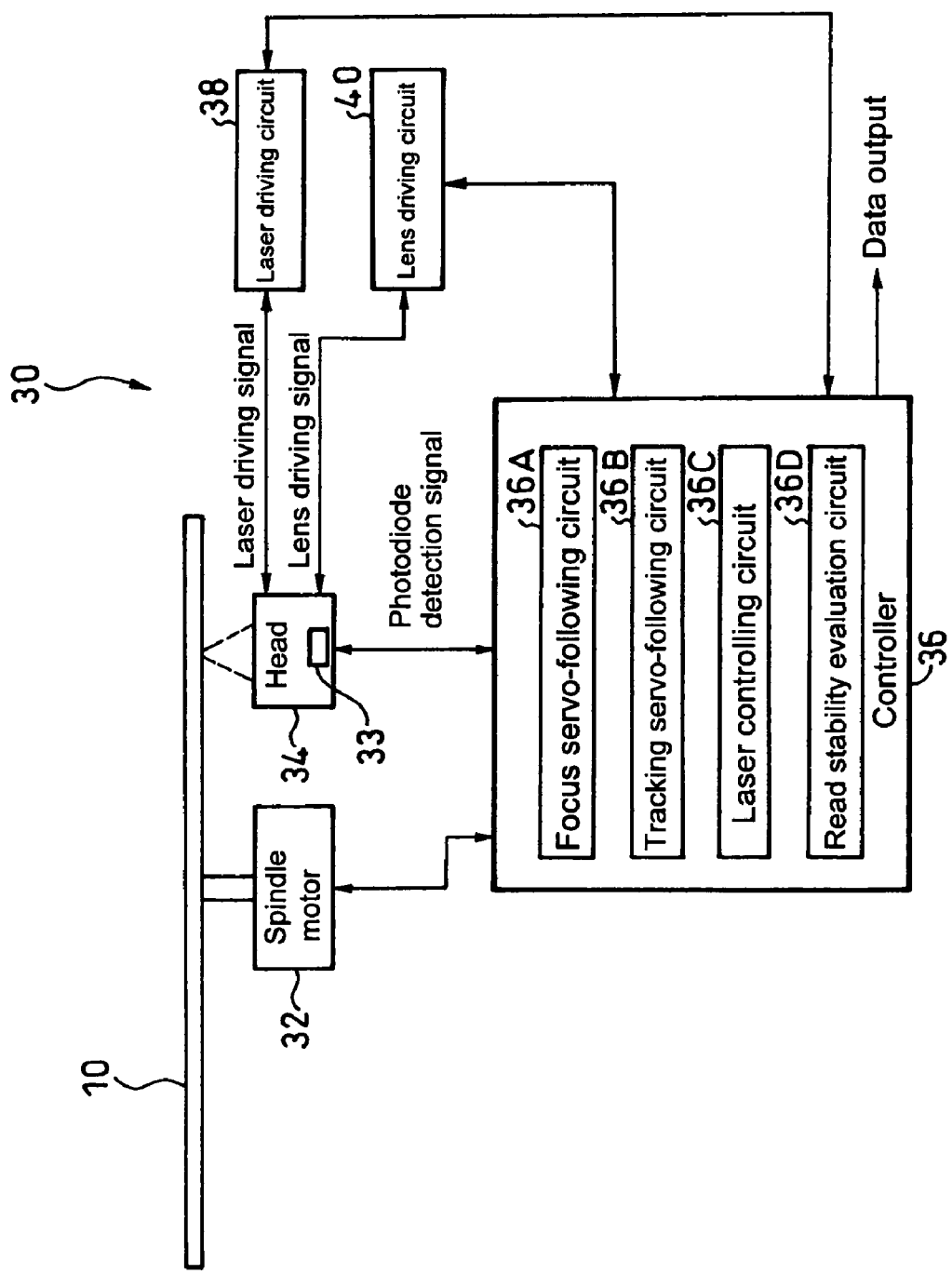
FIG. 1 is a block diagram schematically illustrating an information reproduction apparatus according to an exemplary embodiment of the present invention.

An information reproduction apparatus 30 of this exemplary embodiment is shown in FIG. 1 and is configured to readout information from an optical disc 10 and to evaluate the read stability of the optical disc 10.

The information reproduction apparatus 30 is configured to include: a spindle motor 32 for rotating the optical disc 10; a head 34 which has a laser light source 33 and an optical system (not shown) and which is provided for projecting a laser beam onto the optical disc 10; a controller 36 for controlling the head 34 and the spindle motor 32; a laser driving circuit 38 which supplies a laser driving signal for modulating the laser beam from the head 34 into a pulse train; and a lens driving circuit 40 which supplies a lens driving signal to the head 34.

The controller 36 includes a focus servo-following circuit 36A, a tracking servo-following circuit 36B, a laser controlling circuit 36C, and a read stability evaluation circuit 36D.

The laser controlling circuit 36C is a circuit for generating the laser driving signal supplied by means of the laser driving circuit 38 and is configured to generate, based on readout condition setting information recorded on a target optical disc, a laser driving signal suitable for read stability evaluation.

The readout condition setting information is information used to determine various conditions required for reproducing data recorded on the optical disc. In this exemplary embodiment, the readout condition setting information includes at least the information required for evaluating the read stability of the optical disc.

Examples of the readout condition setting information include not only information specifically indicating various conditions required for evaluating read stability of the optical disc but also information for determining the readout conditions by specifying any of the various conditions pre-stored in the information reproduction apparatus.

Figure 2:
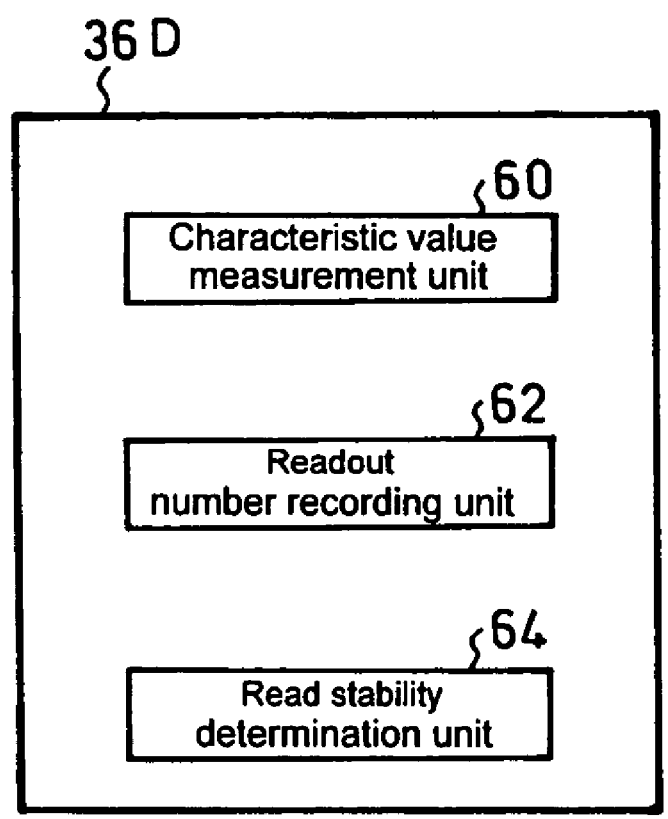
FIG. 2 is a block diagram schematically illustrating a read stability evaluation circuit according to the exemplary embodiment of the present invention.

As shown in FIG. 2, the read stability evaluation circuit 36D includes a characteristic value measurement unit 60, a readout number recording unit 62, and a read stability determination unit 64.

The characteristic value measurement unit 60 has the function of reading, in real time or at intervals of a specified number of readout times, readout data outputted from the controller 36 to measure the change in a characteristic value for the number of readout times.

The readout number recording unit 62 has the function of, when the characteristic value reaches a predetermined value, recording the number of readout times at this point.

The read stability determination unit 64 has the function of computing the number of readout times at a normal read power on a disc based on the data recorded by the readout number recording unit 62 and on equation (3).

The characteristic value measurement unit 60, the readout number recording unit 62, and the read stability determination unit 64 may be independent or integrated.

The value indicating the characteristic may be one of a CNR, a jitter, an error rate, or the like or it may be a combination thereof.

Figure 3:
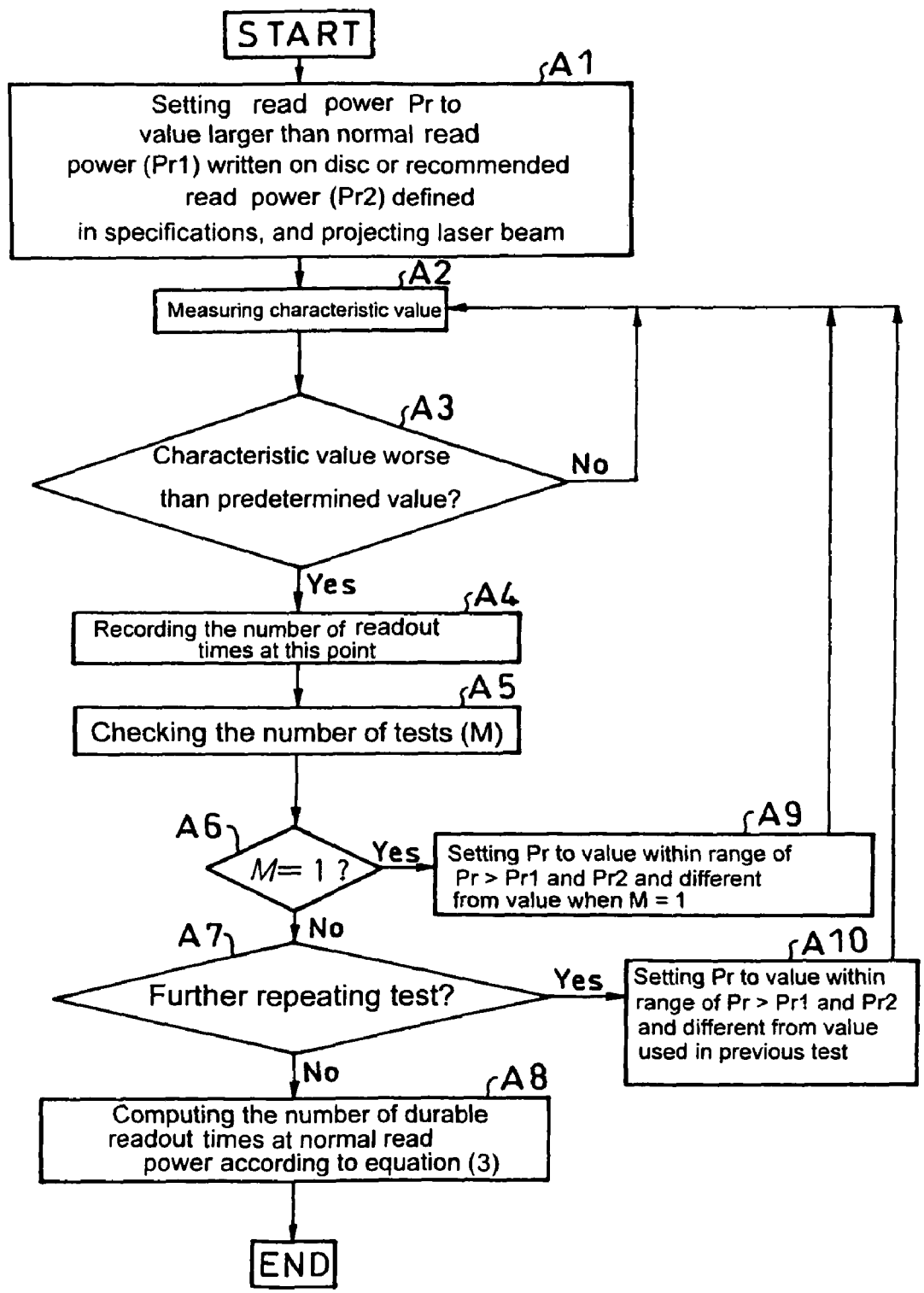
FIG. 3 is a flowchart showing the outline of a read stability evaluation method according to the exemplary embodiment of the present invention.

The characteristic value measurement unit 60, the readout number recording unit 62, and the read stability determination unit 64 are configured such that the read stability of a recordable optical disc is evaluated according to the flowchart shown in FIG. 3.

The method for evaluating read stability will now be described with reference to the flowchart shown in FIG. 3.

In A1, a laser beam is applied at a read power Pr which is set higher than a normal read power $Pr_1$ contained in the normal readout condition setting information recorded on an optical recording medium or higher than a recommended read power $Pr_2$ defined in the specifications. The read power Pr may be set to any value as long as $Pr>Pr_1$ or $Pr>Pr_2$ holds. Preferably, in order to complete the measurement in a short time, the read power Pr is set as high as possible so long as the mechanism of deterioration does not change.

In this instance, the mechanism of deterioration refers to the type of deterioration. For example, when the disappearance of an amorphous recording mark due to crystallization is defined as a certain mechanism of deterioration, the mixing of each of the films constituting a medium or the mechanical fracture of a certain film due to heat is another mechanism of deterioration.

In A2, a target characteristic value is measured at intervals of a specified number of readout times or while a laser beam is applied at the read power Pr. As described above, a CNR, a jitter, an error rate, or the like may be employed as the target characteristic.

In A3, a determination is made as to whether or not the measured characteristic value is worse than a predetermined value. As described above, the predetermined value may be any value. For example, a change in CNR of −3 dB (being the difference from an initial value) may be employed, or a change in a jitter of +1% (being the difference from an initial value) may be employed. Furthermore, the maximum permissible error rate of a system may be employed as the error rate. When the degree of deterioration is less than the predetermined value, the above procedure is repeated until the degree of deterioration becomes worse than the predetermined value. When the deterioration does not proceed even after the readout is repeated a large number of times, the procedure may be interrupted. In this case, the test may be re-started from A1 after the read power Pr is increased.

In A4, when the degree of deterioration reaches the predetermined value, the number of readout times at this point is recorded. The number of readout times may be recorded in real time or after a certain period of time.

In A5, the number of tests is checked. In this instance, the number of tests is assigned to M.

In A6, a determination is made as to whether or not M is 1. If M is 1, the process proceeds to A9. If M is not 1, the process proceeds to A7.

In A7, a determination is made as to whether or not the test is further repeated. If the test is repeated, the process proceeds to A10. If the test is not repeated, the process proceeds to A8.

In A8, the number of durable readout times when the readout is to be performed at the normal read power $Pr_1$ is computed according to equation (3).

In A9, Pr is set to another value which is different from the value of Pr when M=1 and which falls within the range $Pr>Pr_1$ or $Pr>Pr_2$, and the process proceeds to A2.

In A10, Pr is set to another value which is different from the previously set value and which falls within the range $Pr>Pr_1$ or $Pr>Pr_2$, and the process proceeds to A2.

In this case, in order to apply equation (3) in A8, at least two different read powers must be used. However, since the number of tests has been checked in A6, at least two tests have been performed. Therefore, since at least two different read powers have been used, the condition for applying equation (3) has been ensured.

A minimum difference between the at least two different readout powers may be any value other than 0. The setting of the difference in the read power during measurement depends somewhat on information reproduction apparatus. For example, when the read power is represented by $a \times 10^n$ mW (wherein $1.0 \leq a < 10$, and n is an integer), the minimum difference may be $1.0 \times 10^{n-1}$ mW or $2.0 \times 10^{n-1}$ mW.

In addition to this, the more the number of tests, the higher the reliability of the data. However, when the number of tests is increased, the measurement time increases to impair the effect of this embodiment, being a reduction in evaluation time. However, an examiner may arbitrarily determine the number of tests depending on their desired purposes.

Measurement Example 1

Hereinafter, a description is given of Measurement Example 1 of the present invention.

Figure 4:
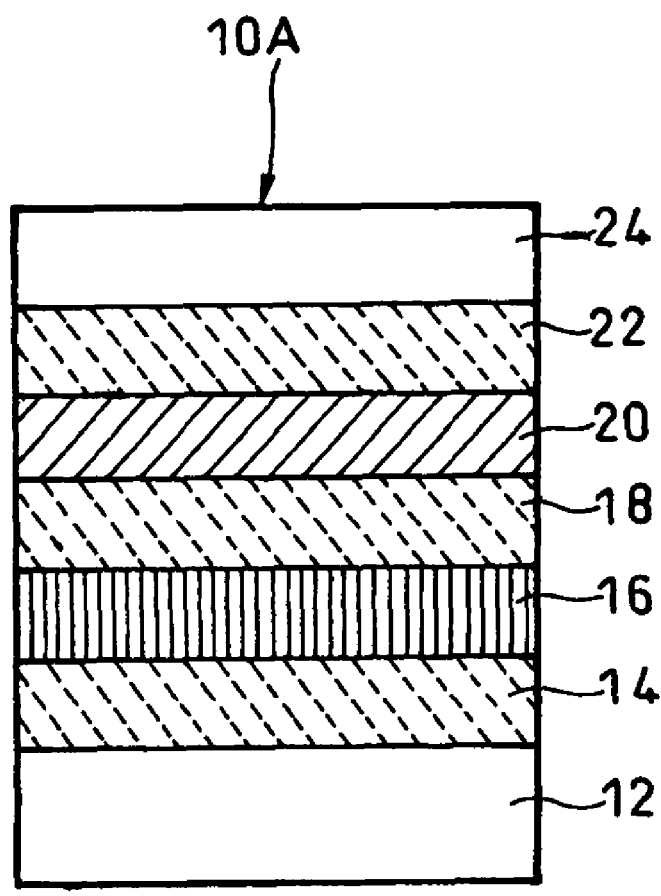
FIG. 4 is a cross-sectional view schematically illustrating a super-resolution optical disc to be evaluated in Measurement Example 1 in accordance with the present invention.

In this Measurement Example, a super-resolution optical disc 10A shown in FIG. 4 was used as the optical disc.

A super-resolution optical disc is a disc having therein a layer for improving the resolution, whereby, in a reproduction optical system with a readout wavelength of λ and an objective lens numerical aperture of NA, a train of marks (bits) smaller than λ/(4NA) which is smaller than the resolution limit can be read.

As shown in FIG. 4, the super-resolution optical disc 10A is formed by stacking a first dielectric layer 14, a super-resolution layer 16, a second dielectric layer 18, a recording layer 20, a third dielectric layer 22, and a light transmission layer 24 in this order on a substrate 12.

The substrate 12 is formed of polycarbonate, for example.

Furthermore, each of the first dielectric layer 14, the second dielectric layer 18, and the third dielectric layer 22 is made of a metal oxide, a semiconductor oxide, a metal sulfide, a semiconductor sulfide, or the like, such as $ZnS-SiO_2$, ZnS, or ZnO.

The recording layer 20 is made of a material such as PtOx which changes its optical constant when decomposed into platinum and oxygen, however, it should be appreciated that the recording layer material is not limited to PtOx. Any material may be employed so long as it changes its optical constant and undergoes some degree of shape change when irradiated with a recording laser beam and so long as recording marks formed in the recording layer 20 do not disappear when a read laser beam is applied thereto.

The super-resolution layer 16 is made of a material having super-resolution ability that allows recording marks having a length of $\lambda/(4NA)$ or less to be reproduced. The super-resolution layer 16 is made of one material selected from among elements including Sb, Bi, and Te and compounds of Sb, Bi, Te, Zn, Sn, Ge, and Si, such as Sb—Zn, Te—Ge, Sb—Te, Sb—Bi, Bi—Te, and Sb—Bi—Te which contain any of the above listed elements.

Furthermore, other materials may be used so long as they are opaque to the wavelength of a read laser beam and have low thermal conductivity.

Moreover, a material obtained by adding at least one of Ag and In to one of the above materials may be employed as the material for the super-resolution layer 16.

In practice, $(ZnS)_{85}(SiO_2)_{15}$, for example, was employed as the material for each of the first, second, and third dielectric layers 14, 18 and 22, respectively, formed on the substrate 12. Furthermore, $Sb_{75}Te_{25}$ was employed as the material for the super-resolution layer 16, and PtOx was employed as the material for the recording layer 20, thereby forming a super-resolution optical disc.

Specifically, the super-resolution optical disc serving as the optical disc was formed by stacking: a reflection film having a thickness of 40 nm and made of Ag:Pd:Cu=98:1:1; a first dielectric layer having a thickness of 20 nm and made of $ZnS:SiO_2=85:15$; a super-resolution layer having a thickness of 10 nm and made of $Sb_{75}Te_{25}$; a second dielectric layer having a thickness of 40 nm and made of $ZnS:SiO_2=85:15$; a recording layer having a thickness of 4 nm and made of PtOx; a third dielectric layer having a thickness of 90 nm and made of $ZnS:SiO_2=85:15$; and a light transmission layer having a thickness of 0.1 mm in this order on a polycarbonate substrate. Furthermore, an optical system with a wavelength $\lambda$ of 405 nm and an objective lens numerical aperture NA of 0.85 was used.

Figure 5:
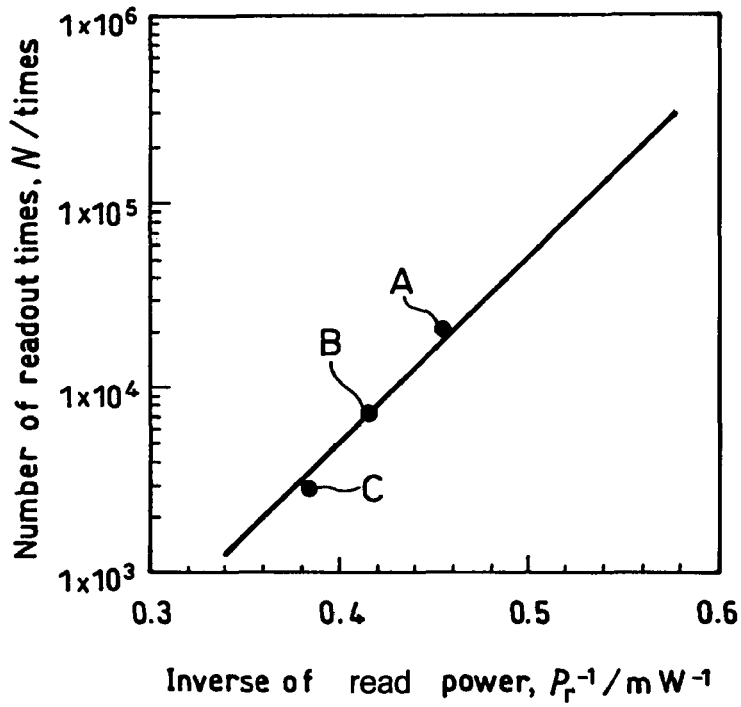
FIG. 5 is a graph showing the read stability of the optical discs of Measurement Example 1 in accordance with the present invention.

In this Measurement Example, irradiation at Pr=2.0 mW is required for super-resolution readout, and thus read stability must be evaluated at Pr=2.0 mW. However, in practice, the measurement was performed at three read powers of $Pr_1=2.2$ mW, $Pr_2=2.4$ mW, and $Pr_3=2.6$ mW. The inverses of these are $1/Pr_1=0.45$, $1/Pr_2=0.42$, and $1/Pr_3=0.38$, respectively. The number of readout times when the change in CNR relative to the CNR at initial readout reached −3 dB during readout at each of the read powers was approximately 20,000 for $Pr_1$, approximately 7,000 for $Pr_2$, and approximately 2,800 for $Pr_3$. The results are shown in FIG. 5. In FIG. 5, the vertical axis is a logarithmic axis representing the number of read times when the change in CNR relative to the CNR at the initial readout reaches −3 dB during readout of the recording marks of 300 nm ($>\lambda/(4NA)$) at each of the read powers, and the horizontal axis represents the inverse of the power. The point corresponding to $Pr_1$ is represented by symbol A, and the point corresponding to $Pr_2$ is represented by symbol B. Furthermore, the point corresponding to $Pr_3$ is represented by symbol C. As can be seen from FIG. 5, readout deterioration proceeds according to equation (3). In other words, the present evaluation method has high reliability. Meanwhile, it has been known that the change in CNR reaches −3 dB when readout at Pr=2.0 mW, which is required in the evaluation of this Measurement Example, is repeated approximately 60,000 times. A similar result can be obtained by determining the gradient from the results of $Pr_2$ (B) and $Pr_3$ (C) as shown in FIG. 5 and extrapolating the gradient to Pr=2.0 mW, which is the required read power. In this manner, the read stability at a required read power Pr of 2.0 mW can be estimated more easily and more rapidly than in the case where the read stability is actually measured at Pr=2.0 mW. Furthermore, the same results were obtained when the read stability was evaluated for recording marks of 75 nm ($<\lambda/(4NA)$). Moreover, it was also found that equation (3) also holds in the case where the number of readout times when the change in CNR relative to the CNR at initial readout reaches −1 dB is used as the measure for N in the vertical axis.

Measurement Example 2

Hereinafter, a description is given of Measurement Example 2 of the present invention.

Figure 6:
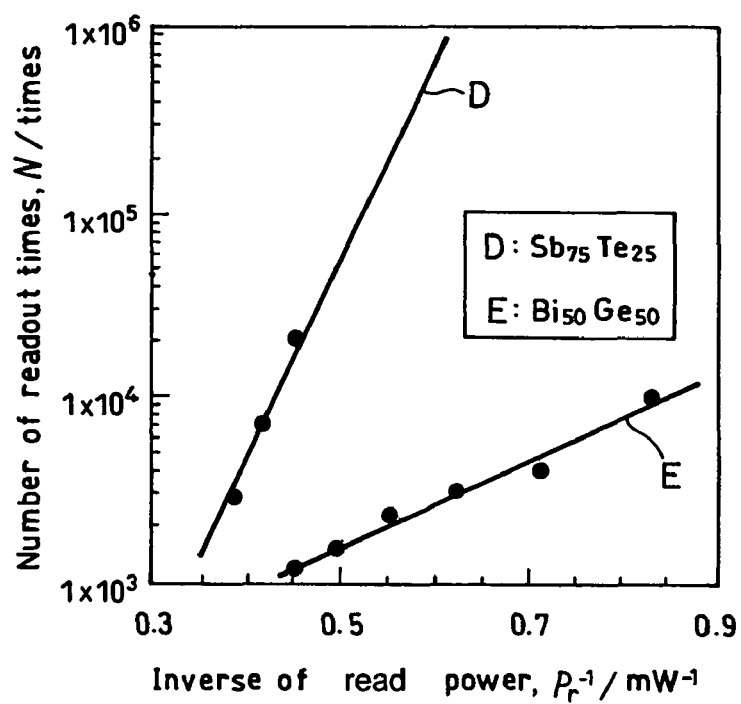
FIG. 6 is a graph showing a comparison in read stability between the optical discs of the Measurement Examples 1 and 2 in accordance with the present invention.

In this Measurement Example, the same super-resolution optical disc as in Measurement Example 1 was employed as the optical disc, except that a different combination of materials was used. Specifically, the super-resolution optical disc used was formed by stacking: a reflection film having a thickness of 40 nm and made of Ag:Pd:Cu=98:1:1; a first dielectric layer having a thickness of 20 nm and made of $ZnS:SiO_2=85:15$; a super-resolution layer having a thickness of 10 nm and made of $Bi_{50}Ge_{50}$; a second dielectric layer having a thickness of 40 nm and made of $ZnS:SiO_2=85:15$; a recording layer having a thickness of 4 nm and made of PtOx; a third dielectric layer having a thickness of 90 nm and made of $ZnS:SiO_2=85:15$; and a light transmission layer having a thickness of 0.1 mm in this order on a polycarbonate substrate. The same method as in Measurement Example 1 was used. The measurement was performed at read powers Pr of 1.2 mW, 1.4 mW, 1.6 mW, 1.8 mW, 2.0 mW, and 2.2 mW. The inverses of these are 0.83, 0.71, 0.63, 0.56, 0.50, and 0.45, respectively. The results of both Measurement Examples 1 and 2 are shown in FIG. 6. In FIG. 6, the gradient obtained from the results of Measurement Example 1 is represented by symbol D, and the gradient obtained from the results of Measurement Example 2 is represented by symbol E. As can be seen from FIG. 6, equation (3) still holds even when the combination of materials for the optical disc was changed, and the value of $\Delta E'$ varies depending on the combination of those materials.

Measurement Example 3

Hereinafter, a description is given of Measurement Example 3 of the present invention.

In this Measurement Example, a phase change type disc was used as the optical disc. The phase change type disc used was formed by stacking: a first dielectric layer having a thickness of 100 nm and made of $ZnS:SiO_2=80:20$; a reflection layer having a thickness of 100 nm and made of Ag:Pd:Cu: = 98:1:1; a second dielectric layer having a thickness of 12 nm and made of $CeO_2$; a recording layer having a thickness of 12 nm and made of Sb:Te:Ge:Tb=74.3:19.2:4.0:2.5; a third dielectric layer having a thickness of 5 nm and made of $ZnS:SiO_2=50:50$; a fourth dielectric layer having a thickness of 30 nm and made of $ZnS:SiO_2=80:20$; and a heat dissipation layer having a thickness of 60 nm and made of $Al_2O_3$ in this order on a polycarbonate substrate.

Figure 7:
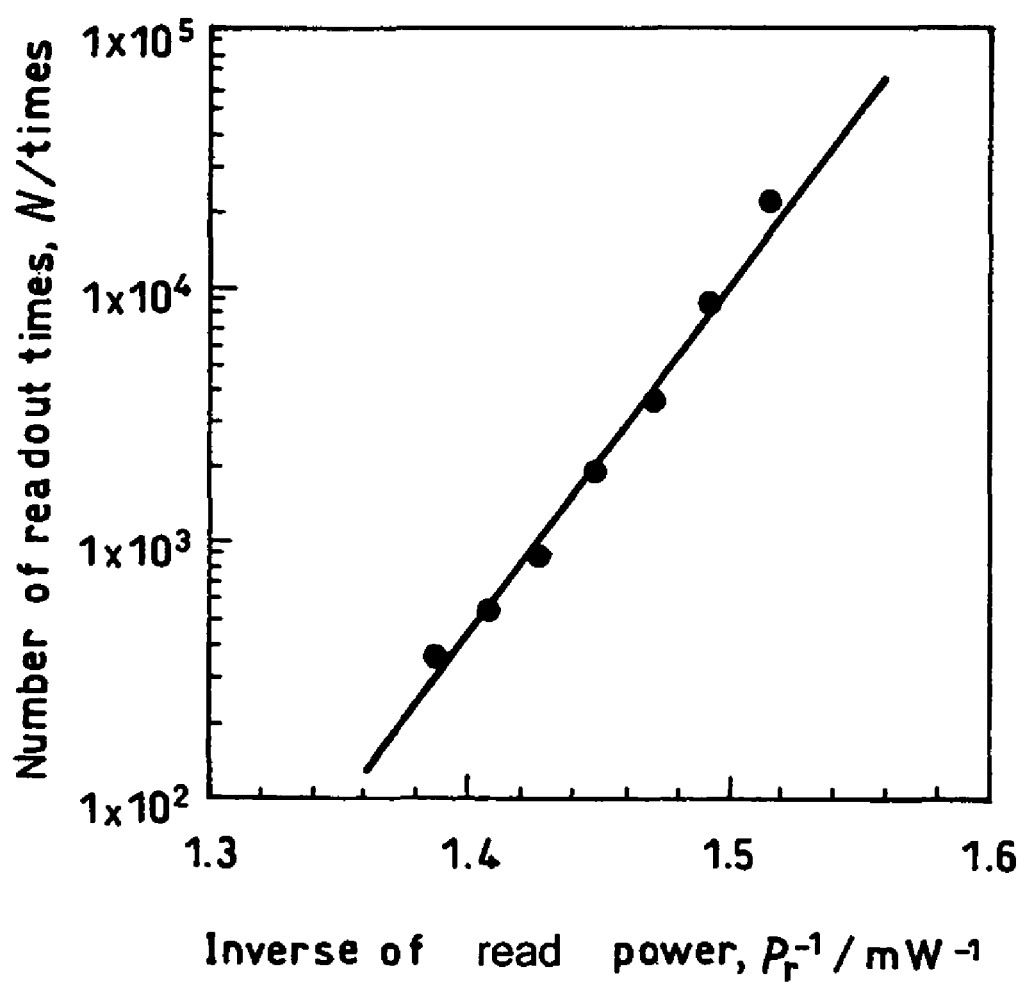
FIG. 7 is a graph showing the read stability of an optical disc of Measurement Example 3 in accordance with the present invention.

In FIG. 7, the vertical axis is a logarithmic axis representing the number of readout times when a jitter during readout of a (1, 7) RLL modulation signal increases from a jitter at initial readout by +1.0% at each of the read powers and the horizontal axis represents the inverse of the read power. As can be seen from FIG. 7, readout deterioration proceeds according to equation (3). In other words, the present evaluation method has high reliability. Furthermore, this Measurement Example shows that, although the type of the medium and the measure in the vertical axis are different from those in Measurement Example 1, the evaluation method of this Measurement Example has high reliability. The normal read power of the phase change type disc used in this Measurement Example is 0.5 mW or less, which is smaller that that for the super-resolution optical disc used in Measurement Example 1. However, the read stability can be estimated irrespective of the read power used.

In addition to this, although not shown in the figure, it was found that equation (3) still holds when the number of readout times when a jitter increases from a jitter at initial readout by +2.0% was used as the measure in the vertical axis.

What is claimed is:

1. A method for evaluating read stability of an optical disc, the method comprising:
   repeating readout of the optical disc using a laser beam at each of at least two read powers including a read power Pr which is set higher than a normal read power $Pr_1$ contained in normal readout condition setting information recorded on an optical recording medium, or high than a recommended read power $Pr_2$ defined in stored specifications of an information reproducing apparatus, the powers being different from each other;
   drawing a graph in which inverses of the read powers are plotted on a horizontal axis and in which on a vertical axis the logarithm of a repeated readout number for each of the read powers is plotted, the repeated readout number being the number of repetitions of the readout when a characteristic value for the number of repetitions of the readout varies and reaches a predetermined value; and
   evaluating read stability by using a gradient of the graph.

2. The method for evaluating read stability of an optical disc according to claim 1, wherein the read powers include two powers different from each other.

3. An information reproduction apparatus for evaluating read stability of an optical disc, the apparatus comprising:
   a head for projecting a laser beam onto the optical disc;
   a laser driving circuit which supplies to the head a laser driving signal for controlling the laser beam;
   a laser controlling circuit which generates the laser driving signal; and
   a read stability evaluation circuit comprising:
   a characteristic value measurement unit which is capable of, when readout is repeated at each of at least two read laser beam powers being different from each other, measuring a change in a characteristic value for the number of readout times;
   a readout number recording unit which, when the characteristic value reaches a predetermined value, records the number of readout times at this point; and
   a read stability determination unit which computes the number of reproducible times at a normal read laser beam power on the optical disc based on data recorded by the readout number recording unit and a predetermined equation for computation.

4. The information reproduction apparatus for evaluating read stability of an optical disc according to claim 3, wherein the read power include two powers different from each other.

* * * * *